J. W. WRIGHT.
PLATFORM FOR TRACTORS.
APPLICATION FILED OCT. 12, 1920.

1,426,938.

Patented Aug. 22, 1922.
2 SHEETS—SHEET 1.

Inventor
J. W. Wright,
By Hume Talbert
Attorney

J. W. WRIGHT.
PLATFORM FOR TRACTORS.
APPLICATION FILED OCT. 12, 1920.

1,426,938.

Patented Aug. 22, 1922.
2 SHEETS—SHEET 2.

Inventor
J. W. Wright,

UNITED STATES PATENT OFFICE.

JAMES W. WRIGHT, OF IOWA, LOUISIANA.

PLATFORM FOR TRACTORS.

1,426,938.  Specification of Letters Patent.  Patented Aug. 22, 1922.

Application filed October 12, 1920. Serial No. 416,353.

*To all whom it may concern:*

Be it known that I, JAMES W. WRIGHT, a citizen of the United States, residing at Iowa, in the parish of Calcasieu and State of Louisiana, have invented new and useful Improvements in Platforms for Tractors, of which the following is a specification.

The object of the invention is to provide simple and efficient means whereby the backward tilting or rearing of a tractor, frequently with disastrous results to the driver, may be prevented under such conditions that in the event of a backward tilt of the tractor, the tractive force of the driving wheels may be reduced or eliminated to permit the machine to return to its normal position, and with this object in view, the invention consists in the construction and combination of parts, of which a preferred embodiment is shown in the accompanying drawings, wherein:—

Figure 1:
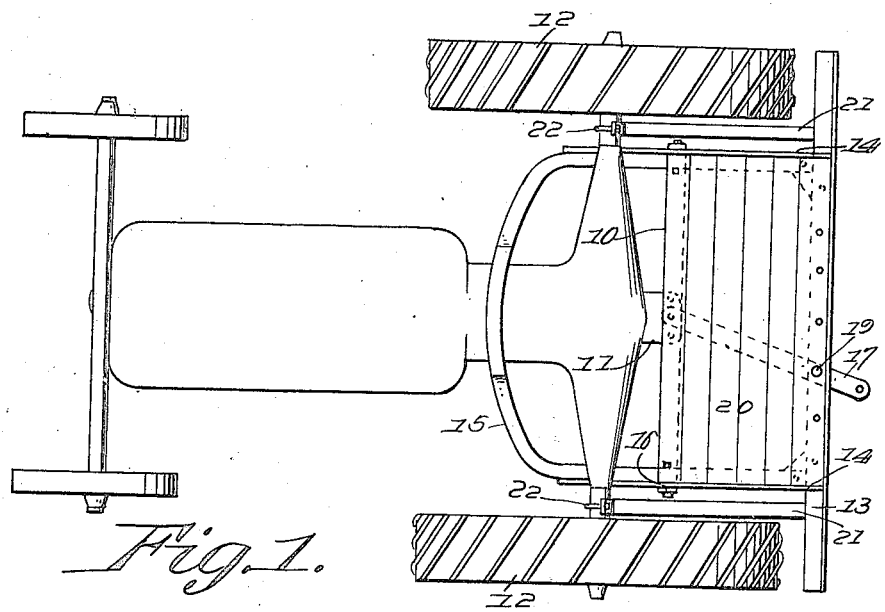
Figure 1, is a plan view of a tractor provided with the safety device, embodying the invention.
Figure 2:
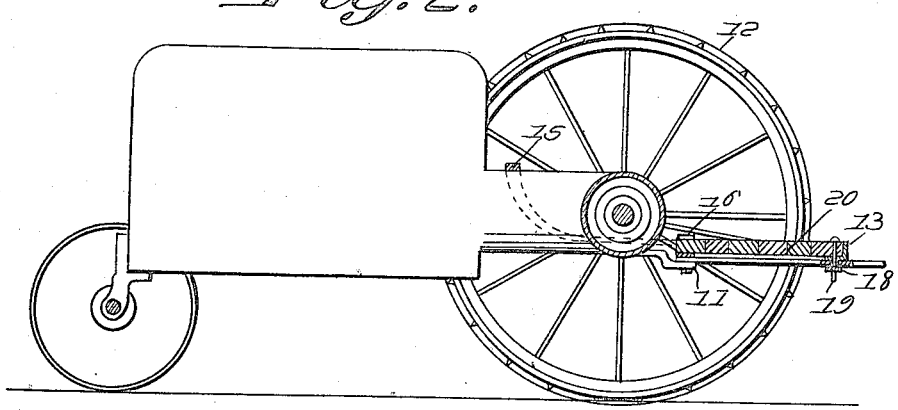
Figure 2, is a side view of the same.
Figure 3:
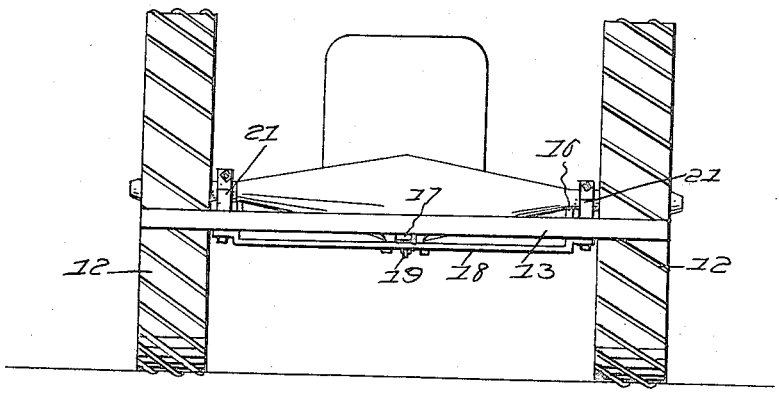
Figure 3, is a rear view.
Figure 4:
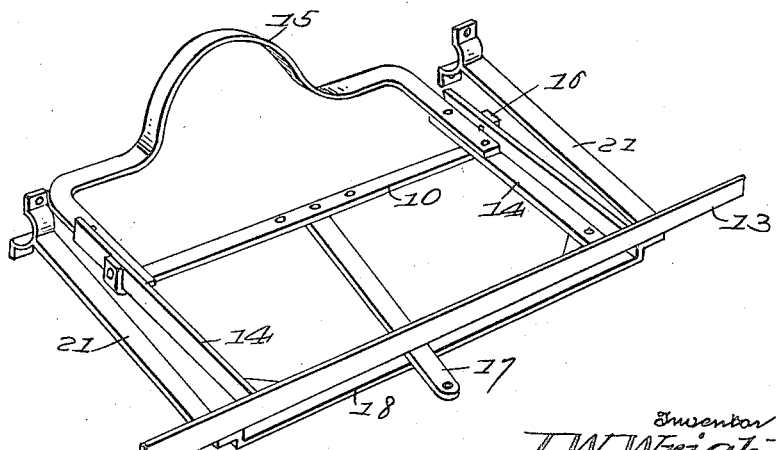
Figure 4, is a perspective view of the adjustment, disconnected from the tractor.

The apparatus is designed to be applied to a commercial form of tractor as hereinbefore indicated without involving any material modification in the construction of the machine to the end that it may be constructed and applied as an attachment to tractors already in use and to this end it embodies a forward cross bar 10 adapted for central attachment to a usual form of tractor draw bar 11, the said bar 10 being of a length sufficient to extend almost to the driving or traction wheels 12 of the machine, the rear cross bar 13 arranged to extend terminally in rear of the traction wheels and side bars 14 connecting the said front and rear cross bars and extending in advance of the former where said front ends are connected by a rod yoke 15 extending over the transmission box or other convenient portion of the tractor frame.

The extremities of the forward cross bar 10 are preferably up-turned as indicated at 16 to engage the side bars 14 to which they are bolted or otherwise substantially secured and pivotally mounted at an intermediate point upon the draw bar 10 of the tractor is a draw rod 17 extending rearwardly and adapted for connection and movement inwardly with the plane of the cross bar 13 with reference to which it may be guided by a guide rod 18 to assume any desired position in the traction or driving of the tractor and any machine to be drawn thereby. If preferred, the draw rod may be located in a fixed relation to the tractor frame by means of a bolt 19, engaging registering openings in the guide rod 18 and the rear cross bar 13.

The auxiliary draw bar 17 serves as the means for connecting the tractor to its load and should that become great enough to result in a tendency to raise the forward part of the tractor, as is frequently the case with such machines, the rear cross bar 13 is swung toward the ground and finally engages the latter. The tendency then is to slightly elevate the traction wheels, thus diminishing their tractive effect upon the soil, thus permitting them to turn more freely and thereby allow the forward end of the tractor to assume normal position.

The frame formed by the front cross bars 10 and 13 and the side bars 14 is preferably utilized as a support for the platform 20 composed of suitable planks arranged so that the operator of the machine may stand thereon, if desired in preference to occupying the driver's seat, and in addition this platform serves as a convenient support for tools and parts of devices which are needed by the operator in the operation of the machine.

The invention having been described, what is claimed as new and useful is:—

An attachment for tractors, having front and rear cross bars of which the former is attached to the tractor draw bar, and of which the latter is disposed in terminal overlapping relation with the tractor wheels, side bars connecting said front and rear cross bars and extending in advance of the former, and a rod yoke connecting the forward extremities of the side bars and disposed in spanning relation with the frame of the tractor.

In testimony whereof he affixes his signature.

JAMES W. WRIGHT.